Nov. 18, 1969    W. SAUERMANN    3,478,498
FILTER STRUCTURE
Filed Dec. 13, 1967
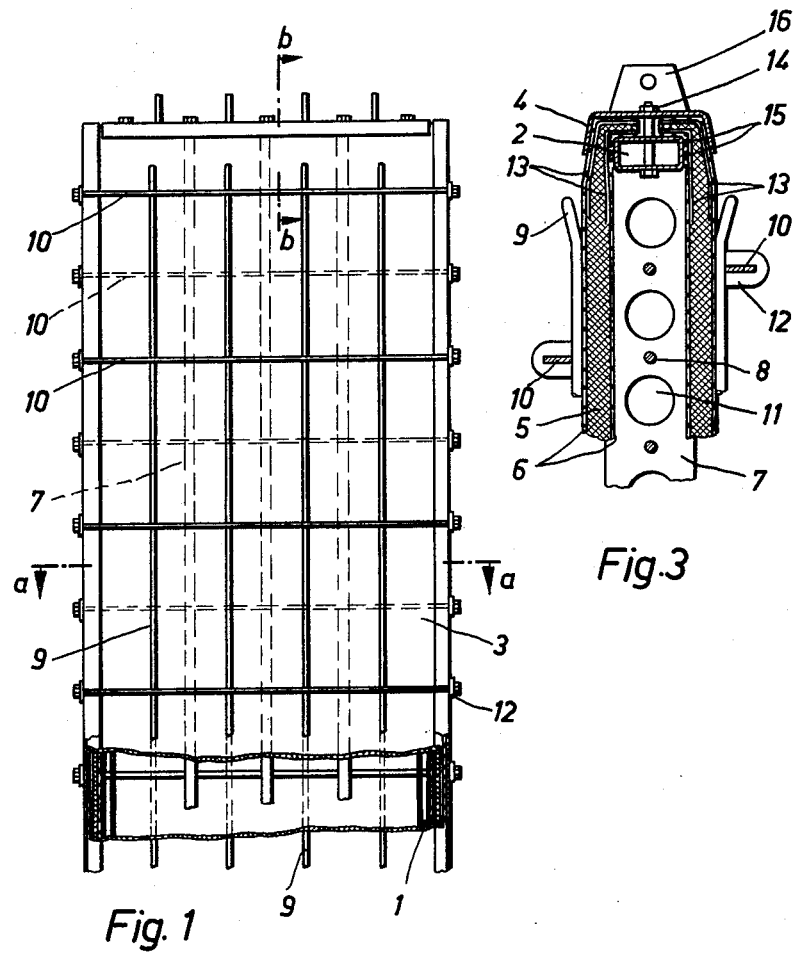
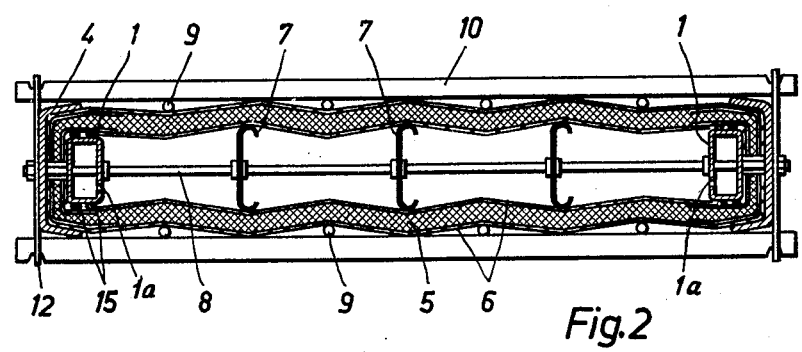
Inventor:
Werner Sauermann
By Michael S Striker
Attorney

United States Patent Office 3,478,498
Patented Nov. 18, 1969

3,478,498
FILTER STRUCTURE
Werner Sauermann, Munster, in Westfalen, Germany, assignor to Standard Filterbau-GmbH, Munster, in Westfalen, Germany
Filed Dec. 13, 1967, Ser. No. 690,224
Claims priority, application Germany, Dec. 17, 1966,
St 26,307; Sept. 27, 1967, St 27,381
Int. Cl. B01d 35/00
U.S. Cl. 55—492                        14 Claims

ABSTRACT OF THE DISCLOSURE

A filter comprises a frame and a filter element carried by the frame to define therewith an internal chamber. The filter element consists of two apertured supporting layers and a filter layer of fibrous filter material sandwiched therebetween. A plurality of supporting bars are located in the internal chamber and engage the inner surfaces of the filter element. A plurality of deflecting bars engage the outer surfaces of the filter element intermediate the reinforcing bars and deflect the filter element intermediate such reinforcing bars inwardly into the chamber.

BACKGROUND OF THE INVENTION

The present invention relates to a filter structure in general, and more particularly to a filter structure of the type known as a pocket filter wherein the filter element defines an interior chamber.

In the filtration of gaseous fluids which are contaminated with dust particles, and particularly when such gaseous fluids are at high temperatures, it is known to use filter elements consisting of a layer of heat resistant mineral fibers sandwiched between two layers of wire mesh. Such filter elements are secured to a suitable frame having an open or apertured side, and with this frame they define an internal chamber or "pocket." The fluid to be filtered is either admitted into the pocket so that the impurities are retained in the pocket and the filtered fluid passes outwardly through the filter element, or else the fluid is passed into the pocket through the filter elements from the exterior so that the contaminants are retained at the outside and the filtered fluid will leave the chamber through the open side of the frame. Regardless of the type of application which is chosen, however, a problem is encountered which the present invention is intended to overcome. Reference is had here to the fact that it has heretofore not been possible to so stiffen and compress the fibrous filter material as to prevent undesirably deep penetration of dust particles and analogous impurities and to assure that these are retained at the filter element surface. Such stiffening and compression of the fibrous filter material is also essential to give the layer of filter material sufficient strength to withstand removal of the impurities accumulated at the surface. Finally, compression of the fibrous filter material will, of course, enhance the filtering action.

Attempts to provide a solution to this problem have heretofore centered on the provision of means connecting the inner and outer supporting layers of wire mesh. Such means included clamps, screws, rivets or like elements which were secured to the supporting layers and extended from one to the other thereof through the layer of filtering material. This, however, has been found to be highly unsatisfactory because at the points of penetration through the layer of filtering material the latter always permitted passage of unfiltered fluid. This situation invariably worsened in the course of use of the filter and resulted in the development of breaks in the thin material fibers of the filtering material. Such breaks invariably developed directly below the wires of the wire-mesh supporting layers and over a period of time propagated through the layer of filtering material in a straight line resembling an incision. Obviously, the filter element was then no longer usable. This problem was encountered not only where the supporting layers were connected to one another, but also where the edge portions of the filter element were rigidly and fluid-tightly connected with the supporting frame. It is a general object of the present invention to overcome the aforementioned problems.

A more particular object of the present invention is to provide a filter structure, particularly in a pocket-type filter, wherein the layer of fibrous filter material is stiffened and compressed without damage to its integrity.

A further object of the invention is to provide, in a filter structure of the type in question, for securing of the filter element to its supporting frame in such a manner as to effect a fluid-tight connection therebetween.

A concomitant object of the invention is to simplify the manufacture of such filter structures while simultaneously increasing their operational reliability.

SUMMARY OF THE INVENTION

In accordance with one feature of my invention I provide, in a filter structure of the type under discussion, particularly in a pocket-type filter, a frame, and a filter element which is carried by this frame. The filter element has two opposite sides and includes two apertured supporting layers and a filter element of fibrous filter material which is sandwiched between the supporting layers. Reinforcing means engaged one side of the filter element at a plurality of spaced first locations for the purpose of supporting the filter element at this one side. Finally, I provide deflecting means which engages the other side of the filter element at a plurality of spaced second locations intermediate the first locations, and which deflects the filter element in the region of these second locations in the direction towards the aforementioned one side to thereby compress and stiffen the layer of fibrous filter material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view, partially in section, of a filter structure embodying my invention;
FIG. 2 is a section taken on the line a—a of FIG. 1; and
FIG. 3 is a fragmentary enlarged section taken on the line b—b of FIG. 1.

DESCRIPTION OF THE PREFERRED EMBODIMENTS

The filter structure illustrated by way of example in the drawing comprises a supporting frame which consists of two elongated longitudinally extending frame portions 1, and two elongated transversely extending frame portions 2 which connect the frame portions 1. All frame portions in the illustrated embodiment are tubular and are of rectangular cross-sectional configuration, as is most clearly evident in FIGS. 2 and 3. However, it is to be noted that this cross-sectional configuration could be circular, quadratic or generally polygonal, and that the frame need not be hollow but could be of solid cross-section. One of the frame portions identified with reference numeral 1 is suitably apertured as shown at 1a to provide for ingress or egress of fluid into the interior of the filter. It is also possible to eliminate one of the frame portions entirely.

The frame consisting of the frame portions 1 and 2 carries on its oppositely directed surfaces the filter elements 3 which, as is most clearly evident from FIGS. 2 and 3, each consist of a layer 5 of heat resistant fibrous material sandwiched between an inner and an outer supporting layer 6. Three layers are suitably apertured for passage of fluid therethrough, and in the illustrated embodiment are assumed to consist of wire mesh. The edge portions of each filter element are bent over, as illustrated in FIGS. 2 and 3, so as to partially overlie the outer peripheral edge face of the supporting frame. The filter elements are secured to the supporting frame by means of a channel-shaped clamping element 4. FIGS. 2 and 3 show that this element 4 is of substantially U-shaped cross-section but converges inwardly away from its open side. Screws, bolts or other suitable elements 14 connect the clamping element 4 to the respective frame portions 1 and 2 in the manner clearly illustrated in FIG. 3 and serve to draw the respective frame portion, and the filter-element edge portion overlying the same, into the channel-shaped clamping element 4 whereby the filter element edge portions are pressed against the respective frame portions 1 and 2 as a result of the converging cross-sectional configuration of the element 4, as seen in FIGS. 2 and 3. To provide an improved seal I prefer to dispose one or more rope-like sealing members intermediate the edge portions of the filter elements and the respective frame portions. These sealing elements are identified with reference numeral 15 and preferably consist of asbestos although other materials are also suitable. To properly protest the layer 5 of fibrous filter material against damage, and more specifically against disruption of its integrity, I dispose strip-shaped foils 13, preferably of aluminum, between the respective supporting layers 6 and filter element 5 in the region of the edge portions of the filter element. This is clearly shown in FIG. 3. In accordance with a further concept of my invention these foils 13 may be provided on those surfaces thereof which face the respective supporting layers 6 with self-adhesive means and this will not only serve to connect the foils and the respective supporting layers 6, but because of the aforementioned nature of the latter it will also serve to connect the rope-like sealing elements 15 to the filter element. The provision of foils 13 serves to distribute the locally concentrated pressure exerted by the individual wires of the wire-mesh supporting layer 6 against the layer 5, over a wider area than otherwise possible and to thereby protect the layer 5 against damage.

In the illustrated embodiment the inwardly directed surfaces of the two filter elements which are each constituted by one of the layers 5 and two of the layers 6 are engaged by supporting members 7 (compare FIGS. 1 and 2). FIG. 2 in particular shows that these supporting members 7 in the illustrated embodiment are of substantially C-shaped cross-section and are arranged in parallelism with one another and with the frame portions 1. It is evident, of course, that the members 7 could also be arranged in parallelism with the frame portions 2, if so desired, or that they could be inclined to all of the frame portions. The members 7 are spaced from one another and from the frame portions 1, as clearly shown in FIGS. 1 and 2, and the number and spacing of these members 7 will be determined according to the application for which the completed filter structure is intended. In the illustrated embodiment the width of the members 7 is slightly greater than the width of the frame portions 1, but it is to be understood that it could be smaller or larger than illustrated. FIG. 3 shows that the members 7 are provided with cutouts 11 for the purpose of reducing their weight. Evidently the configuration of these cut-outs could be other than circular and it is also possible to eliminate them entirely.

Connecting rods 8 secure the members 7 to one another and to the frame portions 1 in any desired manner so as to provide a limited structure. Such connection is well known and within the purview of those skilled in the art, and requires no detailed discussion.

Located externally of the respective filter elements are deflecting elements which in the illustrated embodiment assume the form of a plurality of elongated rods, tubes or bars 9 of circular cross-section. These elements 9, which hereafter will be assumed to be small-diameter tubes 9, extend in substantial parallelism with the members 7 intermediate the same and, as seen with reference to the respective outermost members 7, between these and the associated frame portions 1. This is clearly illustrated in FIG. 2. The deflecting tubes 9 are secured in suitable manner, by welding or in any other desired way, to transversely extending support members 10 which are visible in FIGS. 1–3 and which, as most clearly seen in FIG. 2, have end portions projecting outwardly beyond the clamping element 4 which receives the frame portions 1. In the illustrated embodiment these projecting end portions are provided with notches in which hook-shaped or otherwise configurated connecting members 12 are engaged. The particular configuration of the connecting members 12 is not illustrated, but it is clear that they must be capable of drawing the supporting members 10 located at opposite sides of the filter structure, inwardly towards one another. This can be accomplished by properly choosing the dimensions of the members 12, or by making the dimensions of the members 12 adjustable in a sense permitting the connected supporting members 10 to be drawn towards one another. By drawing the members 10 inwardly towards one another in this manner, the members 10 in turn will press against the tubes 9 and the latter will deflect the respective filter element inwardly into the interior of the filter structure, as shown in FIG. 2. This results in compacting of the material of the layer 5 to the desired extent, and provides for stiffening of the layer 5. Because the integrity of the layer 5 is not disrupted by connecting members or portions thereof, extending from one of the layers 6 to the other through layer 5, the layer 5 is not weakened and the heretofore existing problems are thus eliminated.

It will be evident that substitutes for the members 7 and 9 are readily conceivable, and to make such substitutions would not affect the concept of the present invention as long as the desired compacting and stiffening of the respective layers 5 is assured, without disruption of the integrity of the layer 5 or without creating circumstances which can lead to such disruption. It will also be understood that under certain circumstances it may suffice if inward deflection of the respective outermost layers 6, and concomitant compacting of the associated layer 5 is not as pronounced as illustrated in FIG. 2, that is if the respective innermost layer 6 remains in substantially planar condition. Generally speaking, however, deflection to the extent illustrated in FIG. 2 is necessary to achieve the desired results. Elements 16 of FIG. 3, which are attached to clamping element 4, could provide a securing possibility for vibrating devices if required.

It will be understood that each of the elements described above, or two or more together, may also find a useful application in other types of constructions differing from the types described above.

While the invention has been illustrated and described as embodied in a filter structure, it is not intended to be limited to details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a pocket-type filter, in combination, a substantially

U-shaped frame; a pocket-shaped filter element having an inner and an outer side and enveloping and secured to said frame, said filter element including two apertured supporting layers and a filter layer of fibrous filter material sandwiched therebetween; a plurality of spaced supporting means engaging only said inner side at a plurality of spaced first locations for supporting said filter element at said first locations; a plurality of spaced deflecting means for contacting only said outer side at a plurality of spaced second locations intermediate said first locations; and means for urging said deflecting means against said outer side for deflecting said filter element inwardly in the regions of said second locations to compress and stiffen said layer of fibrous filter material without effecting penetration thereof.

2. A filter structure as defined in claim 1, wherein said supporting means comprises a plurality of supporting members each having an engaging surface engaging said inner side and all of said engaging surfaces being located in one plane; and wherein said deflecting means deflects said filter element so that deflected portions of said filter element intersect said plane.

3. A filter structure as defined in claim 1, and further comprising aperture means in said frame for passage of a fluid therethrough.

4. A filter structure as defined in claim 1, wherein said frame is tubular and of substantially rectangular cross-sectional configuration.

5. A filter structure as defined in claim 1, wherein said frame comprises a pair of spaced substantially parallel longitudinal frame portions and a pair of spaced substantially parallel transverse frame portions connecting said longitudinal frame portions, said filter element having two opposite wall portions between which said frame is sandwiched; said supporting means comprising elongated transversely spaced members extending in substantial parallelism with one of said pairs of frame portions and engaging respective inwardly directed surfaces of said wall portions; and said deflecting means comprising elongated deflecting elements extending in substantial parallelism with said elongated members transversely spaced therefrom in engagement with the respective outwardly directed surfaces of said wall portions.

6. A filter structure as defined in claim 5, wherein said wall portions each comprise peripheral edge portions overlying a surface of said frame; further comprising a foil strip interposed between said filter layer and the respective supporting layers in the region of said edge portions; and a channel-shaped elongated clamping element surrounding said frame exteriorly thereof and clampingly pressing said peripheral edge portions of said wall portions against said frame.

7. A filter structure as defined in claim 5, wherein said frame has a peripheral side face extending between two opposite surfaces; said wall portions each comprising a peripheral edge portion including an inner section overlying one of said opposite surfaces and an outer section extending at an angle to the respective inner section and overlying said peripheral side face of said frame.

8. A filter structure as defined in claim 5, and further comprising sealing means interposed between said wall portions and the respective associated frame surfaces.

9. A filter structure as defined in claim 6, wherein said foil strips each have a face facing said filter layer and another face facing one of said supporting layers; and further comprising self-adhesive means provided on said other face.

10. A filter structure as defined in claim 8, said sealing means comprises at least one elongated rope-like sealing member.

11. A filter structure as defined in claim 10, wherein said sealing member consists of asbestos.

12. A filter structure as defined in claim 6, wherein said channel-shaped clamping element is of substantially U-shaped cross-sectional configuration which tapers inwardly away from the open side of said clamping element; and further comprising threaded means connecting said clamping element to said frame and being operative for urging the latter deeper into said clamping element whereby said edge portions of said wall portions are sealingly pressed against said opposite surfaces of said frame in response to deeper penetration of the same into said clamping element.

13. A filter structure as defined in claim 9, wherein said support layers consist of wire mesh; and further comprising at least one elongated rope-like sealing member interposed between the respective wall portion and the frame surface associated therewith and adhering to said self-adhesive means.

14. A filter structure as defined in claim 6, said frame having a predetermined thickness, and said elongated members each having a thickness at least substantially corresponding to said predetermined thickness so that the engaging surfaces of said elongated members are located at least substantially in the plane of the respective frame surface.

References Cited
UNITED STATES PATENTS

| | | | |
|---|---|---|---|
| 1,012,122 | 12/1911 | Budil | 55—341 |
| 1,323,421 | 12/1919 | Sweetland | 210—486 |
| 1,735,007 | 11/1929 | Lanes | 210—486 |
| 1,835,475 | 12/1931 | Dorfan | 55—484 |
| 2,041,495 | 5/1936 | Schwiers | 210—486 |
| 2,758,671 | 8/1956 | Silverman et al. | 55—484 |
| 2,959,247 | 11/1960 | Sare et al. | 55—382 |
| 3,177,637 | 4/1965 | Davis | 55—483 |
| 3,273,321 | 9/1966 | Bauder et al. | 55—341 |

FOREIGN PATENTS

| | | |
|---|---|---|
| 475,091 | 11/1937 | Great Britain. |
| 803,227 | 10/1958 | Great Britain. |
| 990,587 | 4/1965 | Great Britain. |
| 1,325,839 | 3/1963 | France. |

HARRY B. THORNTON, Primary Examiner

B. NOZICK, Assistant Examiner

U.S. Cl. X.R.

55—500, 502, 514, 521; 210—485, 486, 489